MARGIN TURNAROUND TECHNIQUE FOR PHOTODIGITAL READER

Filed Jan. 16, 1967

INVENTOR
ROY A. JENSEN

BY John L. Jackson
ATTORNEY 3,473,164

MARGIN TURNAROUND TECHNIQUE FOR PHOTODIGITAL READER

Roy A. Jensen, San Jose, Calif., assignor to International Business Machines Corporation, Armonk, N.Y., a corporation of New York Filed Jan. 16, 1967, Ser. No. 609,437
Int. Cl. G11b 5/02
U.S. Cl. 340—173 9 Claims

ABSTRACT OF THE DISCLOSURE

In a system in which a flying spot scanner scans data lines separated alternately by an opaque strip and a transparent strip, a line change system in which the scanning spot is, at the end of a data line, allowed to continue on into the transparent margin and a control signal generated a predetermined time later. The control signal, which is generated at the time of sweep reversal, reverses the sense of the tracking servo of the scanner. The movement of the spot up or down the data lines is controlled by logically selecting at which side, right or left, if at all, a horizontal displacement pulse is applied.

BACKGROUND OF THE INVENTION

Field of the invention

This invention pertains to radiant energy and electron beam scanning systems in general and more particularly to a scanning system for scanning lines of data which accomplishes line change under control of an internally generated pulse which reverses the sense of the tracking servo, and by means of an externally controlled displacement pulse which is selectively applied at the end of the data lines.

Description of the prior art

U.S. Patent 2,843,841 to King provides a system wherein a flying spot scanner is caused to track on and scan concentric lines of data rotated past it which are, as in the present invention, recorded alternately separated by an opaque strip and a transparent strip. In the King system, a current pulse is applied to the deflection plates of the scanning CRT to cause the beam to kick out from the track being scanned into the transparent area between the tracks and the track servo sense is reversed to cause the beam to move to the next track.

As will be appreciated by one skilled in the art, at 1500 lines per inch and 1500 bits per inch which is a normal data density, close control during track switching is necessary to prevent multiple line skipping. While this type of track changing system is highly suited for use in photographic storage systems wherein the tracks are not closely spaced, it is not suited for use in a photographic system wherein the tracks are very closely spaced. Disadvantages attendant this system are that it is likely to pick up stray pulses which could cause undesired track changes and multiple track changes when a single change is desired. Additionally, in the system itself, nothing can be done to make it insensitive to transients since it is impulse oriented. Finally, for control purposes, it is desirable that the scanning spot be under linear control which is not the case where an impulse technique is used.

In U.S. application Ser. No. 509,080 entitled "Optical Tracking and Switching System" by R. A. Jensen et al., a flying spot scanner and code pattern is used which is identical to that of the present invention. Line change is accomplished by reversing the tracking servo and simultaneously simulating the entering of a transparent or opaque strip, whichever is appropriate, by clamping the output of the photomultiplier tube. This causes the scanning spot to move vertically in the desired direction. The line change sequence is initiated by counting the bits of a line. An alternate method of initiating track change disclosed in this application is to utilize a control character.

An alternate system which utilizes absolute time instead of bit counting to initiate a line change, i.e., sweep position, was considered but discarded since the frame edge in one particular application can shift as much as 13 mils. Due to this, 13 mils of space would be required on each end of the line to assure that all the data is scanned. Thirteen mils on each end of the line would result in 10% loss of storage capacity in the IBM[1] 1360 Photodigital Storage System.

SUMMARY OF THE INVENTION

Briefly there is provided a flying spot scanning system which scans horizontally along lines of data. The data format facilitates the control of the vertical position of the spot on the data. When the associated photo device sees too much black or too much light, the tracking servo will cause the spot to be driven in a vertical direction to correct for the error. A missing bit detector is used, which after three bit times reverses the sense of the tracking servo. An input (voltage level) is obtained from the sweep volage such that the missing bit detector cannot actuate a horizontal sweep change unless the spot is on a margin. This is to prevent a sweep reversal in the event that a blank area in a line is encountered.

Selective application of horizontal displacement pulses causes the scanning spot to move up or down the lines of data. An external controller controls the application of the displacement pulses in accordance with whether the spot is to move up or down a frame of data. Whether the actual displacement pulse applied is positive or negative depends on the direction being scanned and is, therefore, internally controlled. The horizontal displacement pulses are summed with the sweep triangle waveform in the horizontal sweep driver. The pulses have a step rise with a slow decay. The slow decay removes the displacement that was introduced but does it over the entire length of the sweep such that the sweep rates and resultant data rates are relatively uniform.

DESCRIPTION OF THE PREFERRED EMBODIMENT

Figures 1, 2, 3, 4:
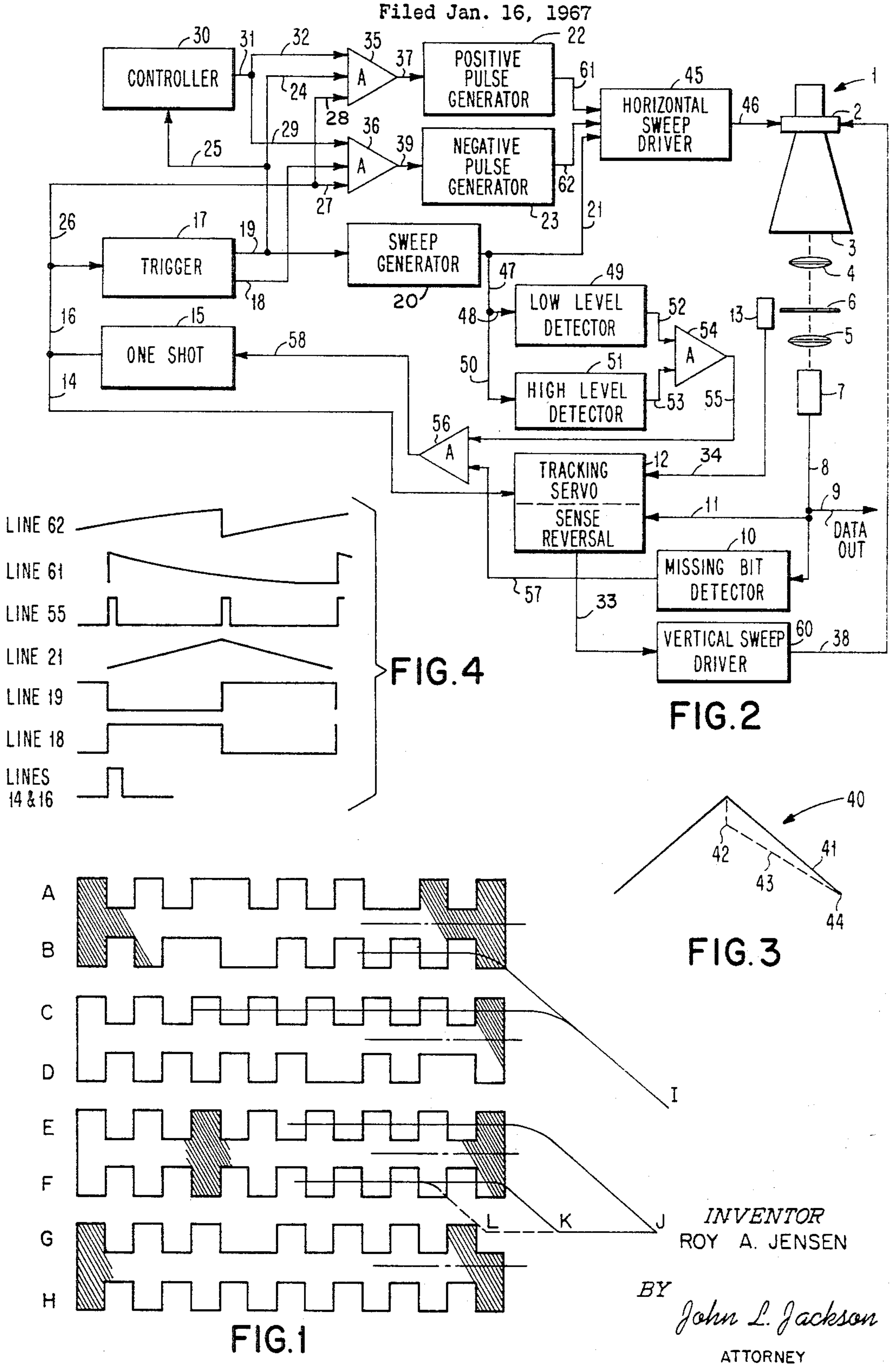
FIG. 1 illustrates the code pattern and spot movement during scanning and line change utilized in the subject system.
FIG. 2 is a block diagram of the overall novel scanner track changing system.
FIG. 3 is a plot of the horizontal sweep waveform as affected by horizontal displacement pulses.
FIG. 4 is a timing chart illustrative of the wave shapes which are generated in the system and the timing thereof.

FIG. 1 is illustrative of the subject novel technique. In FIG. 1, lines of data are shown recorded in pairs separated by an opaque strip, adjacent pairs being separated by a transparent strip. The format may also be described as lines of data alternately separated by a transparent strip and an opaque strip. At the end of each line, a transparent margin portion is provided. The data bits are recorded with a 0 being represented by an opaque space followed by a transparent space while a 1 is represented by a transparent space followed by an opaque space.

During the scanning of a line, a tracking servomechanism is utilized which is grey level sensitive. A grey level sensing technique may be used since, as illustrated in FIG. 1, the information is recorded on the storage media

[1] Trademark, International Business Machines Corp.

such that in each line there is an equal number of opaque and transparent spaces. When the scanning spot is properly centered relative to the line being scanned, a predictable grey level is generated because of this equal number of transparent and opaque spaces. This grey level is monitored to supply servo signals to a cathode ray tube and cause the spot to correctly follow the line of information. Too much light sensed by the servomechanism will cause the spot to be moved in one direction while a lesser amount of light will cause the spot to be moved in the opposite direction relative to the line of information. A more complete description of the coding format and tracking servo is contained in U.S. Patent application Ser. No. 509,080 entitled "Optical Tracking and Switching System" by R. A. Jensen et al. assigned to the assignee of the subject application.

In the present technique, track of line change is accomplished after allowing the scanning spot to run off the data line into the transparent margin. Assume for example that the spot is moving to the right on line C in FIGURE 1. When it enters the margin, it will start down in a direction lateral to the data line due to the action of the tracking servo which reacts to too much light by driving the spot down. At point I, a missing bit detector actuates on the third missing bit and reverses the sense of the servo and the horizontal sweep. Thus, the crossing of the transparent servo track between lines B and C is accomplished. As long as the spot re-enters the frame between the center lines of lines AB and CD, it will lock onto line B. Assume now the spot is moving to the right on line E. The spot enters the margin and starts down. At point J, the missing bit detector reverses the sweep and servo directions. At this point, a small step or displacement pulse is applied to the horizontal sweep serving to displace the spot to point K. The spot then retraces a path parallel to its original path coming in on line F. Thus, the crossing of an opaque servo track is accomplished. The amount of horizontal displacement is not critical as long as it is large enough to bring the spot into the frame below the center line of lines E–F. A much larger than needed displacement only causes the spot to lock on to line F farther from the left margin as shown by displacement J–L. As long as the spot re-enters the frame between the center lines EF and GH, it will move back onto line F.

The procedure is the same at the left end of the frame except to cross an opaque servo track, the horizontal displacement must be the right left. The movement of the spot up or down the frame can thus be controlled by logically selecting at which side, right or left, the displacement lateral to the data line is applied. For example, if applied at the right and not the left side the spot will cross opaque tracks at the right and transparent tracks at the left and thus, move down the frame.

In FIG. 2 is shown a preferred embodiment of the system. A cathode ray tube generally designated at 1 having a conventional yoke 2 has the spot which is swept across its face 3 imaged by means of lens 4 and 5 onto a film 6 containing the data to be scanned. The light from the cathode ray tube 1 is modulated by the code on film 6 and is detected by data photomultiplier 7. The output from the data photomultiplier 7 is applied along line 8 and appears on the data output line 9. The output from the data photomultiplier 7 is also applied to the missing bit detector 10 and along line 11 to the tracking servo 12. The missing bit detector is merely a time delay which is reset by dark portions of the code pattern and it is set such that it will time out after a period of time corresponding to three bit times. The tracking servo 12 including a sense reversal is, as previously described, a servo for centering the scanning spot on the code pattern. A detailed description of the tracking servo and sense reversal will be found in the aforementioned patent application Ser. No. 509,080. The light appearing on the face 3 of the cathode ray tube is also detected by a reference photomultiplier tube 13 which has its output applied along line 34 to the tracking servo 12. Again the operation of the tracking servo 12 on the data supplied by the data photomultiplier 7 and the reference photomultiplier 13 is explained in the aforementioned patent application Ser. No. 509,080. The output of the tracking servo 12 is applied along line 33 to the vertical sweep driver 60 to cause vertical changes in the position of the spot in accordance with the output of the tracking servo 12. The tracking servo 12, as pointed out in the aforementioned application, must be reversible in that the direction to be moved, if too much light is seen by the data photomultiplier and when the spot is moving on a lower line, is exactly opposite the direction to be moved if the spot were moving on an upper line. The sense reversal signals are applied along line 14 to the tracking servo 12 from a one shot multivibrator 15. The initiation of the one shot multivibrator will be later described in more detail.

In FIG. 4 is shown a timing chart illustrative of the various waveforms generated throughout the system and their relative timing which will be referred to in the following description. As shown in FIG. 4, the output from the one shot 15 is applied along line 16 to a trigger 17. The leading edge of the positive pulses from the one shot 15 cause the output line 18 of trigger 17 to go positive at substantially the same time as the leading edge of the one shot. At the same time, the complementary output from the trigger 17 taken along line 19 goes negative. The square waveform signal appearing on line 19 is fed into the sweep generator 20 which provides a conventional triangular waveform on line 21. At the leading edge of the one shot pulse, the output on line 18 goes positive while at the same time the output from the sweep generator 20 appearing on line 21 starts positive. The output on line 21 continues to go positive until the output on line 18 falls to a negative level. This defines the positive portion of the output of the sweep generator. When the trailing edge of the positive output on line 18 falls the output on line 21 from the sweep generator 20 begins to go negative and continues to go negative until the leading edge of the next one shot pulse. The output from the trigger 17 which is indicative of whether or not the spot is sweeping right or left is applied to positive and negative pulse generators 22 and 23, respectively. Thus, the output from line 19 is applied along line 24, and when the AND gate 35 is triggered, to the positive pulse generator 22 and the output appearing on line 18 is applied through an AND gate 36, when triggered, to the negative pulse generator 23. In the following discussion, a positive output on line 19 will be indicative of a left scan while a positive output on line 18 will be indicative of a right scan. The positive pulse generator and negative pulse generator also receive an input from the one shot multivibrator 15 along lines 26, 27 and 28. A final input to trigger the AND gates 35 and 36 and the positive and negative pulse generators is provided from a controller 30 along lines 32 and 39, respectively. The controller 30 is external to the system and will provide a signal along line 31 in the event that an opaque track is to be crossed. A scan direction signal is furnished along lines 19 and 25 to the controller. In FIG. 4 is shown the outputs which appear on lines 61 and 62 from the positive pulse and negative pulse generators 22 and 23, respectively. As shown, the pulses have a rapid rise time and a relatively slow decay time such that they decay over the entire sweep. This is better shown in FIG. 3 wherein a non-altered waveform is shown in a solid line and the actual waveform with a displacement pulse indicated in dotted lines. Considering the waveform 40, line 41 is the traditional non-altered waveform. When a negative displacement is introduced, the sweep begins from point 42 and proceeds along path 43. As shown, the path 43 intersects waveform 41 at point 44 thus illustrating that at the end of the sweep all of the displacement introduced has been dissipated. This relatively uniform dissipation results in minimal interference with the sweep rate and resultant data rate.

The output from the sweep generator 20 is applied along line 21 to a horizontal sweep driver 45 and thus along line 46 to the yoke 2. The horizontal sweep driver 45 is merely a summing amplifier. The output on line 21 is also fed along lines 47 and 48 to a low level detector 49 and along lines 47 and 50 to a high level detector 51. The outputs from the low level detector 49 and high level detector 51 are fed along lines 52 and 53, respectively, to an AND gate 54. The low and high level detectors are merely triggers which have their windows set such that they are set by the high and low portions of the triangular waveform appearing on line 21 to provide an indication of the end of the sweep. AND circuit 54 will therefore have its conditions met near the end of each sweep. In FIG. 4, the resultant output appearing on line 55 from AND gate 54 is shown. The output from AND gate 54 is applied along line 55 and appears as one input term to AND gate 56. The other input term to AND gate 56 is along line 57 from the missing bit detector 10. The output from AND gate 56 is applied along line 58 and is utilized to cause the one shot 15 to fire.

The output from AND gate 54 will go positive near the end of each sweep. If, the spot is in the margin, the missing bit detector 10 will time out and both lines 55 and 56 will be positive thus enabling AND gate 56. If the missing bit detector 10 had timed out while line 55 was negative, the conditions of AND gate 56 would not have been met. This would be indicative of missing bits and not indicative of a margin encounter. When the output on line 58 from AND gate 56 goes up, the multivibrator 15 fires which causes the tracking servo 12, along line 14, to be switched or reversed and acts along line 16 to set trigger 17 and cause a new sweep to be initiated. At the same time, the output from the one shot 15 is applied to the positive and negative pulse generators which will introduce a positive or negative displacement pulse in accordance with the direction being scanned under control of the controller 30.

While the subject system has been described in a cathode ray tube-photomultiplier environment, it will of course be obvious to those skilled in the art that it can be utilized equally as well with other energy sources and transducers as, for instance, electron beam readout with electron detection.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a storage system in which data is recorded in horizontal lines alternately separated in a vertical direction by opaque and transparent stripes and further where a frame of lines is bounded by a transparent margin, a line change system comprising:
   - means for imaging and scanning a light spot horizontally along a selected data line,
   - means for detecting the light modulation of said spot effected by said data line,

- means for positioning said spot relative to said data line responsive to the average level of light falling on said detecting means per unit of time so that if too much light is detected by said detecting means, said spot is caused to move in one lateral direction relative to the data line and if too little light is detected by said detecting means, said spot is moved in the opposite lateral direction relative to the data line,
   - means for generating a first control signal after a predetermined period of excess light, and
   - means receptive of said first control signal for causing said positioning means to move said spot to the next line to be scanned.

2. The system of claim 1 wherein said means for imaging is a cathode ray tube including a horizontal sweep driver and a vertical sweep driver and said means for detecting is a photomultiplier tube.

3. The system of claim 1 wherein said means for positioning if an excess amount of light is detected normally is operative to move the spot in a first direction lateral to the data line and if too little light is detected is operative to move the spot in a second lateral direction relative to the data line and opposite in direction to said first lateral direction, said positioning means also being switchable wherein the lateral movements made responsive to excess or too little lightare opposite to those normally made.

4. The system of claim 2 wherein said first control signal is further operative to reverse the direction of horizontal sweep of said cathode ray tube.

5. The system of claim 4 wherein said first control signal is generated only at the end of each horizontal scan.

6. The system of claim 5 further including sweep generating means for providing a sweep signal to said horizontal sweep driver in which the end of each horizontal scan is determined by measuring the magnitude of the sweep signal from said sweep generator.

7. The system of claim 6 including means for selectively applying a displacement pulse to said horizontal sweep driver at the end of each horizontal scan to cause the scanning spot to move from line to line.

8. The system of claim 7 wherein said displacement pulse has a rapid rise time and a decay time substantially equal to the time required to complete one horizontal scan of a data line.

9. The system of claim 8 wherein said means for applying a displacement pulse is under control of an external controller.

References Cited

UNITED STATES PATENTS

| | | | |
|---|---|---|---|
| 2,523,156 | 9/1950 | Somers | 178—7.2 |
| 2,843,841 | 7/1958 | King et al. | 340—173 |
| 2,894,248 | 7/1959 | Relis et al. | 178—6.6 X |
| 3,188,907 | 6/1965 | Trampel et al. | 340—173 X |
| 3,195,113 | 7/1965 | Giordano | 340—173 |

BERNARD KONICK, Primary Examiner

JOSEPH F. BREIMAYER, Assistant Examiner

U.S. Cl. X.R.

178—72